May 27, 1952 E. T. BURTON 2,598,221

POWER AMPLIFIER CIRCUIT

Filed Nov. 8, 1947 2 SHEETS—SHEET 1

INVENTOR
E. T. BURTON
BY Hugh S. Wertz
ATTORNEY

May 27, 1952 E. T. BURTON 2,598,221

POWER AMPLIFIER CIRCUIT

Filed Nov. 8, 1947 2 SHEETS—SHEET 2

INVENTOR
E.T. BURTON
BY Hugh S. Wertz
ATTORNEY

Patented May 27, 1952

2,598,221

UNITED STATES PATENT OFFICE 2,598,221

POWER AMPLIFIER CIRCUIT

Everett T. Burton, Millburn, N. J., assignor to Bell Telephone Laboratories, Incorporated, New York, N. Y., a corporation of New York Application November 8, 1947, Serial No. 784,885

4 Claims. (Cl. 179—171)

This invention relates to circuit arrangements utilizing unilaterally conducting devices of the type commonly used as amplifiers, and more specifically to arrangements using a pair of such devices to which are applied in both the input and the output circuits thereof voltages of variable intensity.

A principal object of the invention is to amplify signals in a very efficient manner from the power output standpoint.

It is still another object of this invention to utilize unfiltered, full-wave rectified, alternating current in a power amplifier which is suitable, by way of example, for a follow-up circuit, that is, a circuit for causing one shaft to follow the rotation of another shaft located at a distant point, and more specifically for a follow-up circuit utilizing a two-phase alternating current motor. Such a follow-up circuit can be utilized, by way of example, in a radar system having a rotary element associated with a range dial if it is desired to cause a rotary element at a distant station, or at another point at the same station too remote for direct connection to the first rotary element, to follow the rotation of the first rotary element. The second rotary element can be used to impart a component of motion to a computer or director or to an optical sight or range finder. In such a follow-up circuit, the signal applied to the amplifier is an alternating wave of a fixed frequency but which varies between two phase conditions 180 degrees apart with respect to a reference wave.

In a copending application of E. T. Burton, Serial No. 491,789, filed June 22, 1943, and which issued on January 13, 1948, as Patent 2,434,259, there is disclosed a four-tube amplifier used in a follow-up arrangement in which one shaft is adapted to rotate in accordance with the rotation of another shaft at a point too distant to make a mechanical connection practical. The four-tube amplifier can be considered as two groups of two tubes each. One pair of the two pairs of tubes operates (in alternate half cycles) when the input signal wave has one of its two phase conditions and the other pair operates (in alternate half cycles) when the input wave has the other of its two phase conditions with respect to the reference wave. The four-tube arrangement has an alternating voltage wave applied to the anode-cathode circuit of each tube and an alternating grid biasing voltage wave applied to each cathode-grid circuit, the grid bias wave in each tube being of the same frequency and displaced 180 degrees from the plate circuit voltage wave thereof. The present invention is a modification of the four-tube arrangement shown in the copending Burton application and, as it utilizes a fewer number of tubes, may be more suitable in some installations than the four-tube arrangement.

In accordance with the present invention, there is provided a power amplifier circuit utilizing two tubes. Unfiltered, full-wave rectified, alternating voltage is applied between the anode and cathode of each tube and a similar wave but of opposite phase and smaller amplitude is applied between the control element and cathode of each tube, whereby in the absence of signal waves both tubes are cut off. If an alternating signal, either in phase with or 180 degrees out of phase with the wave rectified to produce the anode voltage, is applied in push-pull manner to the input circuits of the two tubes, the two tubes conduct alternately, each for a half cycle. The amplifier is very efficient from the power output standpoint because each tube is conducting for only a fraction of the time and the voltage on the control element is maximum when the plate voltage is also a maximum. The instantaneous maximum power output from each tube can therefore far exceed the rated power output of the tube.

The invention will be more readily understood by referring to the following description taken in connection with the accompanying drawings forming a part thereof, in which.

Figure 1:
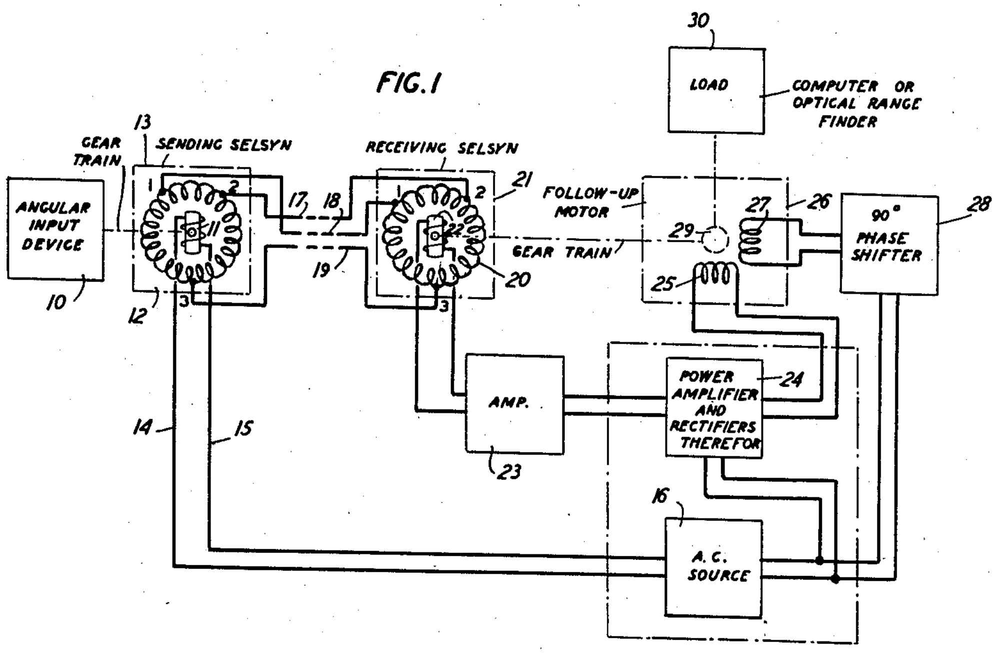
Fig. 1 is a block diagram of a follow-up system utilizing a power amplifier in accordance with the invention.

Referring more specifically to the drawings, Fig. 1 shows, by way of example to illustrate the principles of the invention, a follow-up system which is used to reproduce at a remote station, or at a distant point at the same station, by the rotation of a second shaft, the rotation of a first rotatable shaft. The first shaft can be, for example, that driving the range dial in a distance indicating system of the pulse reflection type or a shaft driven thereby or therewith. This first rotatable shaft is represented as the angular output device 10 in Fig. 1 and is geared or otherwise mechanically connected to the rotor 11 of the sending Selsyn 12 which has a stator member 13 provided with a distributed poly-circuit winding which may be similar to the usual three-phase winding of an alternating current dynamo-electric machine. The winding may be either Y- or delta-connected. The single circuit rotor winding 11 is connected by means of the conductors 14 and 15 to a source of alternating current 16. The stator 13 is connected by means of the conductors 17, 18 and 19, which can be of considerable length, to the stator 20 of the receiving Selsyn 21, which has a rotor member 22 provided with a single circuit winding. The receiving Selsyn 21 is in all respects similar to the transmitting Selsyn 12 but the rotor winding 22 of the receiving Selsyn is connected to the input circuit of the amplifier 23 instead of to the alternating source 16. The term "Selsyn" is being used in the broad sense to include all devices of the general character of the members 12 and 21.

At this point the operation of the sending and receiving Selsyns 12 and 21 will be explained. The rotor winding 11 of the sending Selsyn 12, when energized with current from the alternating current source 16, produces an alternating magnetic field by means of which a voltage is induced in the stator winding 13, thereby causing current to flow in the stator winding 20 of the receiving Selsyn 21. These currents in the stator winding 20 produce an alternating magnetic field by means of which a voltage is induced in the rotor winding 22, when the relationship between the axis of the rotor winding and the axis of the magnetic field is other than 90 degrees. When this 90-degree relationship obtains, no voltage is induced in the rotor winding and, consequently, no component voltage is applied to the input circuit of the amplifier 23 with the result that the system is deenergized and at rest. However, when the rotor 11 of the sending Selsyn is rotated, a magnetic field is set up which induces a voltage in the rotor winding 22 which is either in phase with the voltage wave from the alternating source 16 (which latter wave will hereinafter be designated the reference wave (see Fig. 3A)), or have a phase relationship 180 degrees with respect thereto. This voltage induced in the rotor winding 22 is insufficient to produce a torque large enough to turn the armature of the Selsyn 21 (particularly if a load 30 such as a computer or optical range finder is applied thereto). The amplifier 23, which is of any suitable form, the power amplifier 24 (including the rectifiers therefor) and the follow-up motor 26 serve as a "torque amplifier" for the receiving Selsyn 21. The voltage output of the amplifier 23 is applied to the power amplifier 24 which preferably comprises the two-tube arrangement shown in Fig. 2 and which will be described in detail below. The device 24 produces an amplified version of the output wave of the amplifier 23. The output wave of the amplifier 24 is either in phase with the reference wave from the source 16 or 180 degrees out of phase with respect thereto. This output wave is applied to the field winding 25 of the follow-up motor 26, the other field winding 27 of which is connected through a 90-degree phase shifter 28 to the alternating current source 16. The motor 26 has an armature 29 which is geared or otherwise mechanically connected to drive the rotary member 22 in such a direction that the voltage in the input circuit of the amplifier 23 is reduced to zero. The load 30, which may be a computer or optical range finder or any other mechanical device which it is desired to have follow the motion of the device 10, is geared or otherwise mechanically connected to the armature 29 of the motor 26 or to the armature 22 of the receiving Selsyn 21. The follow-up motor 26 can be of any suitable two-phase type, preferably one which has a low inertia. Such a motor operates by having two alternating voltages applied to its two field windings, these voltages being substantially 90 degrees apart in phase. It will be appreciated that as the voltage applied to the winding 27 (see Fig. 3B) is 90 degrees out of phase with respect to the reference potential from the alternating current source 16, and as the winding 25 has applied thereto a voltage wave (see Fig. 3C) which may be at one particular time in phase with the voltage wave from the alternating current source 16 and at another particular time 180 degrees out of phase with respect to the reference wave from the source 16 (the particular condition depending on which direction the rotary armature 11 of the sending Selsyn 12 is driven and hence the direction that the induced voltage of rotary member 22 takes), then the phase of the voltage wave applied to the winding 25 is either plus or minus 90 degrees with respect to the voltage wave applied to the winding 27, as indicated in Fig. 3C. Thus the armature 29 of the motor 26 will be actuated in one direction or the other to reduce to zero the voltage applied to the input of the amplifier 23, at which time the position of the rotor 22 of the receiving Selsyn 21 will correspond with the position of the rotor of the sending Selsyn 12.

Figure 2:
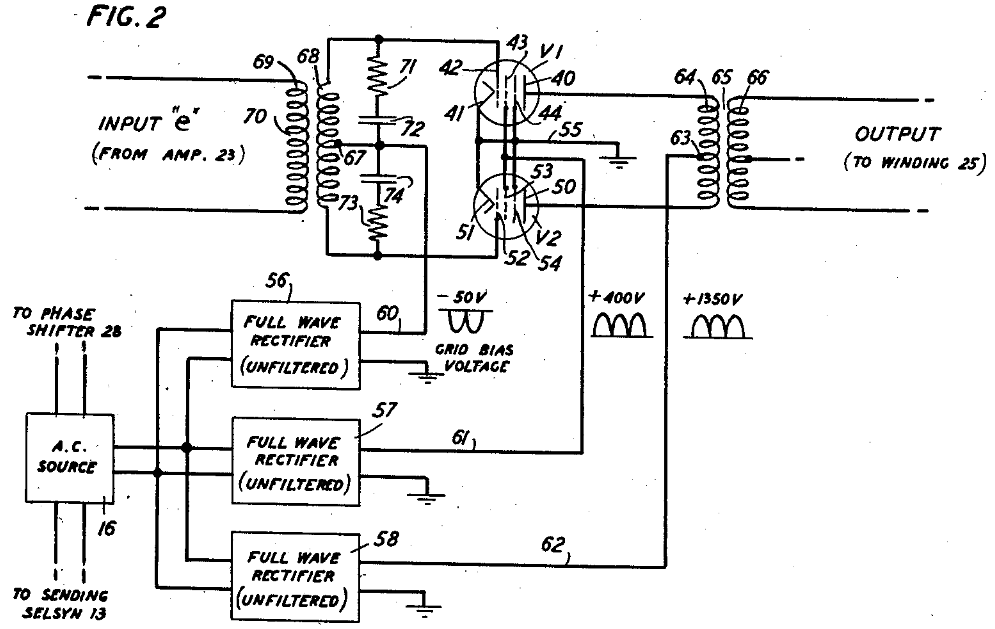
Fig. 2 is a circuit diagram of a portion of the apparatus of Fig. 1 including the two-tube amplifier arrangement in accordance with the invention.
Figure 3:
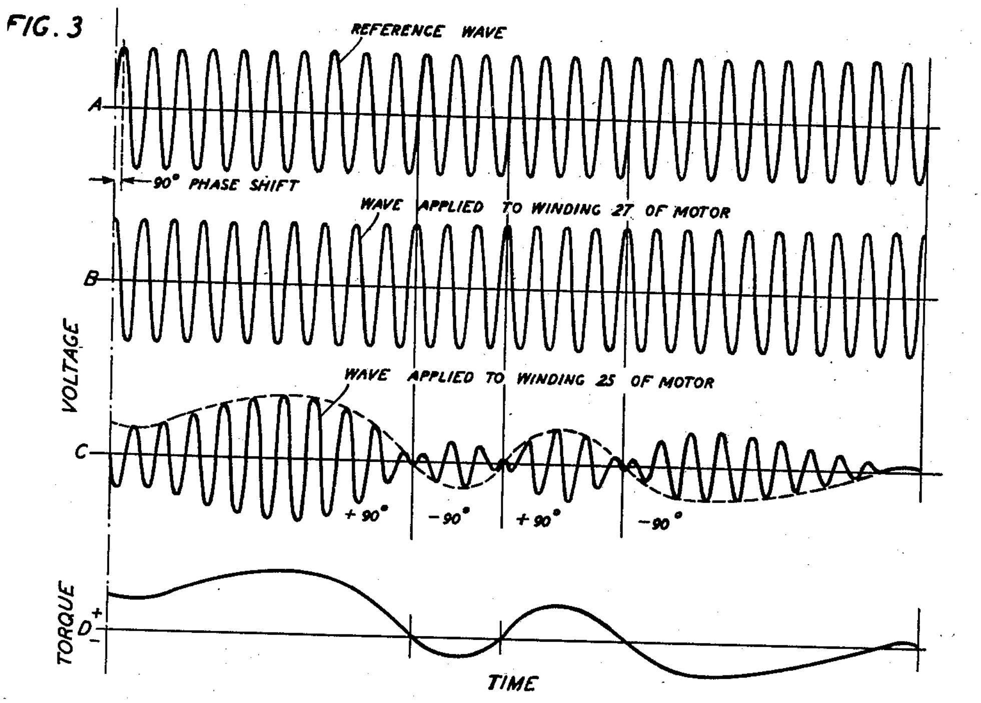
Figs. 3 and 4 are various graphical and diagrammatical representations to aid in understanding the invention.

Reference will now be made to Fig. 2 which is a circuit diagram of a portion of the apparatus shown within dot-dash lines in Fig. 1. The circuit arrangement of Fig. 2 includes a first tube V1 and a second tube V2. These tubes can be of any suitable type but are preferably high vacuum tubes. Tube V1 comprises an anode 40, a cathode 41, a control grid 42, a screen grid 43 and a suppressor grid 44. Tube V2 has corresponding elements 50 to 54, inclusive. Each of the suppressor grids is connected to a corresponding cathode. The cathodes 41 and 51 are connected together and their common terminal 55 is connected to ground which is one output terminal of three rectifiers 56, 57 and 58 each of which receives 60-cycle alternating current power from a source 59 and produces a full-wave, unfiltered output. Any suitable full-wave unfiltered rectifiers may be used as members 56, 57 and 58, the specific details of these rectifiers being no part of this invention. These rectifiers must bear phase interrelationship of zero or 180 degrees as will be described below. These phase differences are also ±90 degrees with respect to the input to motor winding 27 in Fig. 1. Each rectifier has in its input circuit a transformer having a turn ratio such that the rectifier 56 produces an output voltage of the order of 50 volts, the rectifier 57 an output voltage of about 400 volts, and the rectifier 58 an output voltage of about 1350 volts. The ungrounded terminal 60 of the rectifier 56 is negative with respect to ground while the corresponding terminals 61 and 62 of the rectifiers 57 and 58, respectively, are positive with respect to ground.

The plate or anode voltage for tubes V1 and V2 is supplied by the rectifier 58, the terminal 62 being connected to the mid-terminal 63 of the primary winding 64 of a transformer 65, the secondary winding 66 of which is connected to the output circuit. The two outer terminals of the winding 64 are connected, respectively, to the anodes 40 and 50 of the tubes V1 and V2, respectively. Since the other terminal of rectifier 58 is grounded, this places 1350 volts between the common terminal 55 of the cathodes 41 and 51 and the mid-tap 63 of the transformer winding 64, the output circuit of the rectifier 58 thus being in the anode-cathode circuit of tube V1 and also in that of tube V2.

A varying-intensity grid bias wave of, for example, 50 volts peak, is applied between the common cathode connection and mid-tap 67 of the secondary winding 68 of the input transformer 69, the primary winding 70 of which is connected to the amplifier 23. The outside terminals of the secondary winding 68 are applied, respectively, to the control grids 42 and 52 of the tubes V1 and V2, respectively. To produce proper phasing, the resistor 71 and the capacitor 72 are connected in a series circuit which is shunted across the upper half of the secondary winding 68 and resistor 73 and capacitor 74 are connected in a series circuit which is shunted across the lower part of this winding.

The screen grids 43 and 53 are connected together and their common terminal is connected to the output terminal 61 of the rectifier 57 which delivers a full-wave rectified unfiltered output voltage of about 400 volts positive with respect to ground. This wave is of the same frequency and in phase with the wave applied in the anode circuit of each of the tubes V1 and V2.

The signal or input wave applied to the input transformer winding 70 from the amplifier 23 can have any value from zero to a peak of 50 volts or even somewhat higher if the grids 42 and 52 are to be driven positive with respect to their cathodes. This signal valve is of the same form as that shown in Fig. 3C and is amplified substantially without distortion by the power amplifier 24 before being applied to the winding 25. The use of alternating voltage which has been rectified and left unfiltered results in a considerable improvement from the standpoint of tube power loss since the limit of power output is in part dependent on the heat dissipating capabilities of the tube elements involved. By varying the plate and screen voltages between zero and maximum during one-half of the alternating current supply cycle, the tube dissipation is materially reduced for given plate and screen voltages. If the tube supplied with full wave unfiltered alternating voltage to the plate and screen grid shows lower loss for a given voltage, it follows that for a given size of tube a higher (alternating) voltage supply can be used than is permissible with direct voltage supply, without exceeding the rating of the tube. This same reasoning applies in even greater measure to the four-tube circuit shown in the above-identified Burton patent, but in the present invention fewer tubes are required to produce a result which is almost as efficient from the power output standpoint. At the same time it does the same work as the four-tube arrangement shown in the Burton patent, since in the present arrangement one of the tubes in the pair is operating at all times regardless of the phase of the input signal, whereas in the earlier arrangement described in the Burton patent, one pair of two tubes operates (in alternate half cycles) when the input signal wave has one of the two phase conditions, and the other pair operates (in alternate half cycles) when the input wave has the other of its two phase conditions with respect to the reference wave.

The operation of the arrangement shown in Figs. 1 and 2 will now be described. If the shaft of the motor member 10 is turned, a rotation of the rotary armature 11 of the sending Selsyn 12 is produced which, in the manner pointed out above, causes a voltage to be induced in the armature 22 of the receiving Selsyn 21. The voltage induced in the winding 22 may be, for example, of the form shown in Fig. 3C, the notation +90 degrees indicating that this portion of the wave leads by 90 degrees the wave shown in Fig. 3B (which is the wave applied to the winding 27 of the motor 26) and the notation −90 degrees indicating that this portion of the wave is lagging the wave shown in Fig. 3B by 90 degrees. The wave shown in Fig. 3B is displaced 90 degrees with respect to the reference wave shown in Fig. 3A, the wave produced by the source 16. The torque of the motor 26 for a signal wave of the type shown in Fig. 3C is indicated in Fig. 3D. It will be noted that it is in one direction (positive) for certain periods, and in an opposite direction (negative) for other periods, these periods being determined by the direction of rotation of the shaft of the motor 10 and hence by the sign of the voltage induced in the winding 22.

Figure 4:
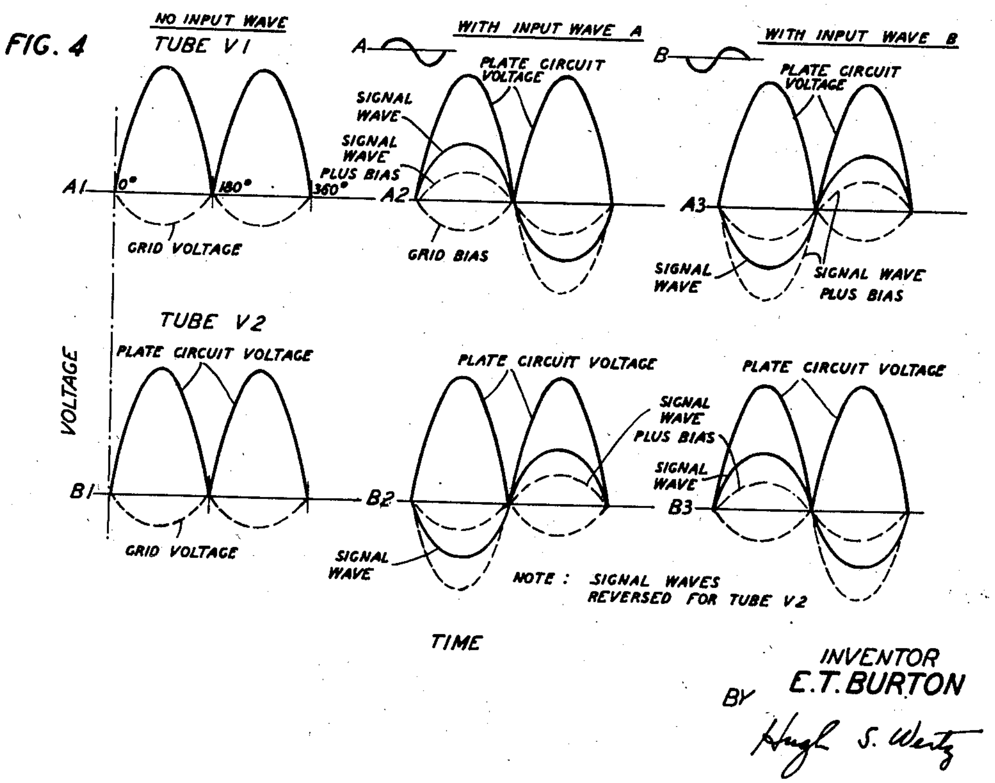

The operation of the two-tube amplifier arrangement 24 will be more readily appreciated by considering the various curves shown in Fig. 4. Fig. 4A1 shows in full lines the plate circuit voltage curve for the tube V1 and in dash lines the grid bias voltage of the same tube. The same two curves are shown in Fig. 4B1 for the tube V2. It will be noted that in the absence of a signal wave, the grid voltage wave is maintained 180 degrees out of phase with the plate circuit voltage wave so that no current flows in either of the tubes when no input wave appears in the primary winding 70 of the input transformer 69. Now assume that the input wave in the primary winding 70 (for at least a cycle of the wave shown in Fig. 3C) has one of its two possible phase conditions, which one condition is called "Input wave A" and is so designated at the top of the second column of the various diagrams collectively designated Fig. 4. Because of the manner of connection of the transformer winding 68, the input wave applied to the control grid of the tube V1 is 180 degrees out of phase with respect to the wave applied to the control grid 52 of the tube V2. In Figs. 4A2 and 4B2 the plate circuit voltage and the input voltage wave have been shown in full lines, the grid bias wave has been shown in dash lines and the algebraic sum of the input wave and the grid bias wave has also been shown in dash lines. These curves are for the tubes V1 and V2 respectively. As indicated in these figures, the input signal wave is of somewhat larger magnitude than the grid bias wave, although it will be appreciated that this is not always necessary. Obviously, the magnitude of the plate circuit voltage wave is much larger in relation to that of the signal or grid bias wave than has been indicated in the drawings. In the condition shown in the second column of Fig. 4, this being indicated "Input wave A," tube V1 conducts current during the first half cycle of signal wave input because both the control grid and the anode of this tube are positive. During this half wave, tube V2 does not conduct current because although the plate voltage is positive, the signal wave is negative during this half cycle. In the second half cycle of the input wave A, the tube V1 is not conducting because the signal voltage wave is negative, but the tube V2 is conducting because both the plate circuit voltage wave and the signal wave are positive. Now if the input wave in the primary winding 70 has the second of these two conditions, which condition will be called "Input wave B" and is so designated at the top of the third column of the diagram comprising Fig. 4, it will be appreciated from a study of Figs. 4A3 and 4B3 that during the first half cycle tube V2 conducts and V1 does not, while in the second half cycle tube V1 conducts and tube V2 does not.

It should be noted that the output waves are amplified replicas of the input waves A and B due to the fact that the output currents of the tubes V1 and V2 flow in opposite directions through the transformer winding 64. These amplified waves are applied to the winding 25 of the motor 26 and produce torque in one direction or the other to drive the rotor member 22 in a direction to reduce the voltage induced in the winding 22 to zero, as indicated in the middle portion of the curve of Fig. 3C. The computer or optical range finder 30 is also driven by the motor 26 (or by the rotor member 22) through a gear train or other suitable mechanical means so that a shaft or other movable member therein tends to follow the movement of the rotary member in the motor 10. As examples of suitable computers (directors) utilizing range information imparted as a rotary movement, reference is made to the book "Elements of Ordnance" by Hayes, chapter XIV.

Various modifications can be made in the circuit arrangement described above without departing from the spirit of the invention the scope of which is indicated in the claims. In the claims, the term "signal" is intended to apply to waves of the kind utilized in electrical control systems, electric power systems, etc. as well as the kind employed strictly for conveying intelligence.

What is claimed is:

1. In combination, two discharge devices in push-pull relationship, each comprising an anode, a cathode and a control element, means for applying a first rectified sine full-wave which varies from zero to maximum during each half cycle of the sine wave between the cathode and anode of each of said devices, and means including means for applying a similar rectified sine full-wave in opposite phase with respect to the first full-wave between the cathode and the control element of each device for keeping the anode current in each device in the vicinity of anode-current cutoff during the full-wave cycle.

2. In combination, two discharge devices in push-pull relationship, each comprising a cathode, an anode and a control element, means for rectifying a first alternating voltage sine wave and deriving therefrom a rectified full-wave which varies from zero to maximum during each half cycle of the sine wave, means for applying said rectified full-wave between the cathode and anode of each device, means for applying a similar rectified full-wave in opposite phase thereto between the cathode and control element of each device, and means for applying as a signal voltage an alternating voltage sine wave of the frequency of said first sine wave and at a phase difference of $n\pi$ therewith (where $n$ is zero or any integer between the cathode and control element of each device.

3. In combination, two discharge devices in push-pull relationship, each comprising a cathode, an anode and a control element, means for rectifying a first alternating voltage sine wave and deriving therefrom a rectified full wave which varies from zero to maximum during each half cycle of the sine wave, means for applying said rectified full-wave as anode voltage between the cathode and anode of each device, means including means for applying a similar rectified full-wave at opposite phase with respect to said first-mentioned rectified full-wave as a biasing voltage between the cathode and control element of each device for keeping the anode current in each device in the vicinity of anode-current cutoff during the full-wave cycle, and means for applying as a signal voltage an alternating voltage sine wave of the frequency of the first sine wave at a phase difference of $n\pi$ therewith (where $n$ is zero or any integer) between the cathode and anode of each device for causing anode current to flow in only one of said devices.

4. In combination, two discharge devices in push-pull relationship, each comprising a cathode, an anode, a screen grid and a control element, means for rectifying a first alternating voltage sine wave and deriving therefrom a rectified full-wave which varies from zero to maximum during each half cycle of the sine wave, means for applying said rectified full-wave to each device between the cathode and anode and between the cathode and screen grid, means for applying a similar rectified full-wave in opposite phase with respect to said first full-wave between the cathode and control element of each device, and means for applying as a signal voltage an alternating voltage sine wave of the frequency of said first sine wave and at a phase difference of $n\pi$ therewith (where $n$ is zero or any integer) between the cathode and control element of each device.

EVERETT T. BURTON.

REFERENCES CITED

The following references are of record in the file of this patent:

UNITED STATES PATENTS

| Number | Name | Date |
|---|---|---|
| 1,669,958 | Walsh | May 15, 1928 |
| 1,752,839 | Gardiner | Apr. 1, 1930 |
| 1,892,924 | Babler | Jan. 3, 1933 |
| 1,940,723 | Miessner | Dec. 26, 1933 |
| 2,070,772 | Ansley | Feb. 16, 1937 |
| 2,226,746 | Schulze-Herringen | Dec. 31, 1940 |
| 2,273,150 | Shepard | Feb. 17, 1942 |
| 2,352,103 | Jones | June 20, 1944 |
| 2,393,936 | Romander | Jan. 29, 1946 |